Feb. 16, 1960 I. H. SUBLETTE ET AL 2,925,588
MEMORY READING SYSTEM
Filed Dec. 31, 1954
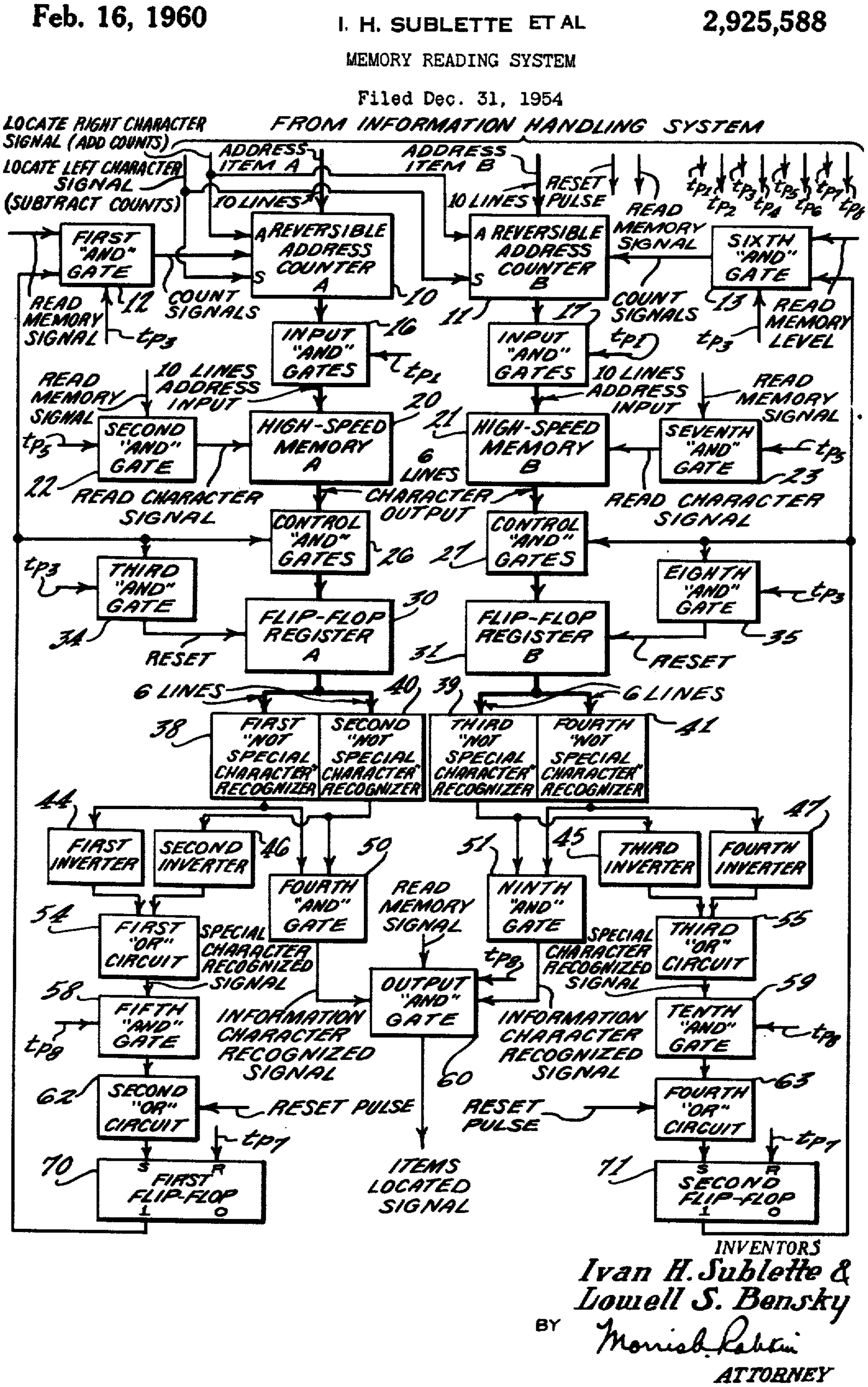
INVENTORS
Ivan H. Sublette &
Lowell S. Bensky
BY [signature]
ATTORNEY

United States Patent Office 2,925,588

Patented Feb. 16, 1960

2,925,588

MEMORY READING SYSTEM

Ivan H. Sublette, Haddonfield, N.J., and Lowell S. Bensky, Levittown, Pa., assignors to Radio Corporation of America, a corporation of Delaware Application December 31, 1954, Serial No. 478,975

8 Claims. (Cl. 340—174)

This invention relates to information handling systems, and particularly to information handling systems having a memory.

Information handling systems, such as computers, are today employed for processing widely differing types of information, such as alphabetic and numeric information. A single system of coding, such as an alpha-numeric code, is often used to provide a uniform means for representing such information. In an alpha-numeric code, each alphabetic character and each numeric character from 0 to 9 may be represented by a different combination of values, such as binary values. A block of characters, such as a word (or "item") is stored and manipulated as a unit. These unitary blocks in some systems are of a standard length. Other systems, however, save storage space and increase operating speed by using information blocks of variable, non-standard maximum length, for example, the computer described in the copending application of applicant L. S. Bensky, filed on or about December 28, 1954, Serial No. 478,021, entitled "Information Handling System." In these systems blocks of characters may be kept separate by special characters, such as item separator symbols and space symbols.

Many other special characters may also be employed in conjunction with items or groups of items. The special characters may include, for example, plus and minus characters, message and document identifying characters, and special typographical characters. Although all the characters represent information, those which set out a particular feature of an item are here called "special," the remainder of the characters being termed the "information" characters. The special characters are usually not to be manipulated or treated with the information characters. Thus when a given item is to be provided from a memory system for addition only the numerical characters may be desired.

In some situations it may be desired to locate the right-hand information characters of an item. Thus least significant characters of numerical items may be desired for an addition or subtraction. In other situations it may be desired to locate the left-hand information characters of an item. For example, the most significant characters of alphabetical items may be desired first for a comparison.

Accordingly, it is an object of the present invention to provide a novel arrangement for locating information stored in variable, non-standard maximum length blocks in a memory system.

Another object of this invention is to provide a novel system for locating a sequence of information characters from a grouping of characters in an information handling system using variable, non-standard maximum lengths.

A further object of this invention is to provide an improved arrangement for matching together characters provided from groupings stored in memory systems.

Yet another object of this invention is to provide an improved arrangement for matching together the terminal characters of sequences of information characters stored in variable, non-standard maximum length items in memory systems.

In accordance with the invention, the characters of a grouping, such as an item, may be provided successively until an information character is found. The item from which the sequence of information characters is to be taken may be stored in a memory. The memory may be addressed, under control of a counter, to locate a terminal (first or last) character of the item. The character derived from the selected location of the memory is placed in a register, which staticizes the character combination. Character recognizers responsive to the register distinguish between the special and information characters. The detection of a special character at the register is employed to advance the addressing counter and also to control the placement of the next character in the register. The detection of an information character at the register terminates the memory reading operation and provides a signal indicating that the desired character has been located.

In accordance with another feature of the invention desired information characters from items stored in two memory systems may be matched together although the number of special characters in the items may be different. The two memory systems are operated in unison as long as special characters are detected. An information character may be recognized in one memory but not the other. The memory in which the information character is provided is not advanced although the other memory is read at successive locations until an information character is found.

The features of the invention, as well as the invention itself, both as to its organization and method of operation, will best be understood from the following description, when read in connection with the accompanying drawing, the sole figure of which represents a block diagram of one arrangement for practicing the invention.

Referring to the drawing, an arrangement is shown which is part of a larger information handling system (not shown). The remainder of the information handling system is more fully shown in the application of Bensky referred to above. Only so much of the information handling system is described herein as is necessary to an understanding of the present invention.

Two examples may be provided to illustrate the problems involved in selecting items of variable, non-standard maximum length having special characters. Two items to be compared for order of precedence may be stored as follows:

Spl Spl Spl J O N E S

Spl B R O W N (Where "Spl" represents any special character).

Because the above items are to be compared most significant character first the memory addresses provided for each item are the addresses of the left-hand characters of each item. A comparison cannot validly begin, however, unless the "J" in "JONES" and the "B" in "BROWN" are concurrently provided.

As a second example, two items to be added may be stored as follows:

3 6 8 Spl Spl 1 2 4 Spl Spl Spl Spl

Here the addition is to be least significant character first, so that the memory addresses provided are those of the right-hand characters. A valid addition will not be made, however, unless the "8" in "368" is matched with the "4" of "124."

The above situations may be provided for by proper programming of an information handling system. Because of the number of contingencies and conditions involved, however, the programming itself is tedious and the time required to complete the program may be considerable.

The information handling system provides the information to be operated on and also provides signals to control the start and timing of the operation. Accordingly, detailed descriptions of the manner in which such signals originate have been omitted for clarity and simplicity in this description. Briefly, however, the signals may be as follows:

(1) Addresses in binary code for each of two items stored in memory systems;

(2) A reset pulse prior to the start of an operation to prepare the system for the operation;

(3) A steady state "read memory" signal to energize certain elements of the system to carry out the operation;

(4) A series of timing pulses, here designated as $tp_1$ to $tp_8$, and (5) Locate right character or locate left character control signals, to govern the manner in which the operation is carried out.

Addresses for two items, A and B, are applied to a reversible A address counter 10 and a reversible B address counter 11, respectively. The counters 10 and 11 may be binary counters of the type which may be set to a given count, and which may count forward or backward as desired. Accordingly, the counters 10 and 11 also include add (A) and subtract (S) inputs. Whether the add or subtract input is actuated determines whether the counter 10 or 11 adds or subtracts signals to be counted.

Each of the reversible address counters 10 and 11 is coupled to and operates with a separate arrangement of elements. These arrangements are substantially alike in structure and operation. Thus, for simplicity, only one arrangement, that associated with the reversible A address counter 10, will be described in detail. It will be understood that like units and couplings are employed with the reversible B address counter 11.

Signals to be counted are applied to the reversible A address counter 10 from a first "and" gate 12. The first "and" gate 12 is responsive to read memory signals, $tp_3$ signals, and to the "1" output of a first flip-flop 70, later to be described. An "and," or coincidence, gate has a plurality of inputs and a single output, and provides an output signal only when all its inputs are actuated. Thus the first "and" gate 12 provides an output on the coincidence of the read memory signal and $tp_3$ and the "1" output of the first flip-flop 70.

Reversible address A counter 10 is here assumed to have ten binary digital positions. Thus the A address counter 10 has a ten line input and provides a ten line output. The separate outputs of the A address counter 10 are coupled to corresponding address inputs of a high-speed A memory 20 through a group of input "and" gates 16. Each of the input "and" gates 16 couples a different output of the A address counter 10 to a different input of the A memory 20. Because each one of the group is responsive to $tp_1$ and each is like any other in function, the group of input "and" gates 16 are designated by a single block.

High-speed memories, such as the A high-speed memory 20, are well known and used in modern information handling systems. On the selection of a given address, such as that provided by a counter, and on the application of a read signal the memory 20 provides as output the character stored at the addressed location. Here, read character signals for the A high-speed memory 20 are provided from a second "and" gate 22 responsive to the read memory signal and $tp_5$.

The characters provided as output by the A high-speed memory 20 are here assumed to be combinations of six binary digits. A six line output is therefore provided from the A memory 20. Individual ones of a group of control "and" gates 26 couple the different outputs of the A memory 20 to corresponding inputs of a flip-flop A register 30. Registers comprised of a number of bistable multivibrators or flip-flops are well known in the art. Each of a number of flip-flops is placed in a steady state condition to represent one digital value in a binary combination. The register, such as the A flip-flop register 30 then holds and "staticizes" the binary combination. In the present example, before a binary combination is applied the A flip-flop register 30 is reset by the output of a third "and" gate 34 responsive to $tp_3$ signals and the "1" output of the first flip-flop 70.

A pair of character recognizer arrangements are coupled in predetermined patterns to the outputs of the A flip-flop register 30. These character recognizers are termed the first "not special character" recognizer 38 and the second "not special character" recognizer 40. The absence of a special character ("not special character") is recognized, rather than the presence of the character, because the mechanization in this instance is simpler. The A flip-flop register 30 provides a high-lever output signal on only one of the two outputs at each digital position. Thus, for a binary combination of all zeroes (000000), all the "0" outputs are high. With the same signal combination all the "1" outputs provide low-level signals. Thus it follows that if any of the "1" outputs is high the all zero signal combination is not present. An "or," or mixer, gate coupled to all the "1" outputs may be used to detect or distinguish the "not all zeroes" (or any other) combination. An "or" gate has a plurality of inputs and a single output, and provides a high-level output if any one or more of its inputs is high.

Expressed in another way, an "or" gate coupled to the complement of each digital value in a desired signal combination will provide a low level signal only when the desired signal combination is present. Here, two "not special character" recognizers 38 and 40 are employed. More may be used if needed for a particular operation. The outputs of the first and second recognizers 38 and 40 are applied to first and second inverters 44 and 46, respectively. The output of an inverter 44 or 46 is a high-level output only when the desired combination is staticized by the flip-flop register A. Thus the inverter 44 or 46 output indicates the presence of the desired character.

The outputs of the first and second "not special character" recognizers 44 and 46 are applied to a fourth, two input, "and" gate 50. The outputs of the first and second inverters 44 and 46 are directed through a first "or" circuit 54 to one input of a fifth "and" gate 58. The remaining input of the fifth "and" gate is activated by $tp_8$ signals. Outputs from the fifth "and" gate 58, and reset pulses from the information handling system (not shown) are directed through a second "or" circuit 62 to the set (S) input of a first flip-flop 70. A flip-flop, or bistable multivibrator, is here designated as having a set (S) input and a corresponding "1" output and a reset (R) input and a corresponding "0" output. The reset input of the first flip-flop 70 is responsive to $tp_7$ signals. "1" outputs from the first flip-flop 70 are applied to one input each of the first "and" gate 12, the control "and" gates 26, and the third "and" gate 34. The first flip-flop 70 may be said to provide conditioning signals for the coupled "and" gates 12, 26, and 34.

As previously stated, the arrangement coupled to the reversible B address counter 11 is similar to the arrangement described above. A ten line address input is applied to the B high-speed memory 21, and a six digit character output is derived from the B high-speed memory 21. Characters provided from the B memory 21 are placed in a B flip-flop register 31, desired special characters are recognized by third and fourth "not special character" recognizers 39 and 41, respectively. Special character recognized signals are applied to a second flip-flop 71.

The outputs of the third and fourth "not special character" recognizers 39 and 41 are applied to a ninth, two input, "and" gate 51. The output of the ninth "and" gate 51 is coupled to one of four inputs of an output "and" gate 60. Similarly, the output of the fourth "and" gate 50 is coupled to an input of the output "and" gate 60. The remaining inputs of the output "and" gate 60 are responsive to read memory signals and $tp_8$ signals. When the output "and" gate 60 provides an output signal the desired portions of the two items have been located and matched. Thus, signals from the output "and" gate 60 may be termed "items located" signals.

Various components of the present system may be related to corresponding components of the system described in the above referred to Bensky application. The reversible A address counter 10 and the reversible B address counter 11 herein, for example, correspond to the A counter 10 and B counter 11, respectively, in Fig. 1 of the Bensky application. The A memory 20 and B memory 21 correspond to the left HSM 15 and the right HSM 16, respectively, in Fig. 1 of Bensky The A flip-flop register 30 and B flip-flop register 31 are like the Y register 13 and the Z register 14 respectively, in Fig. 1 of Bensky. Character recognizers, similar to the first to fourth "not special character" recognizers 38, 39, 40, 41 are found in the Left Symbol Recognition Circuits 22 and the Right Symbol Recognition Circuits 23 in Fig. 1 of Bensky. Note that the timing signals described here as $tp_1$ to $tp_8$ are like $t1$ to $t8$ in the Bensky application.

In operation, the arrangement responds to given instructions by properly locating the characters desired. Assume that the A high-speed memory 20 and the B high-speed memory 21 contain the following items, respectively, at the designated addresses:

Item A— ISS Sp 4 2 6 8 Sp SM (at location 191)
Item B—ISS Sp Sp Sp 2 3 Sp Sp SM (at location 302)

In the above example the following designations are used:

Sp=special Space character
ISS=special Item Separator character
SM=special Start Message character The Space and SM characters illustrate two of the special characters which it may be desired to by-pass in the location of information characters. Greater or lesser numbers, and other special characters, may be recognized if desired.

The location of the item is the address of the first character to be used in the memory. Assume that the items above are to be added, least significant digit first, by the information handling system (not shown). The locations of the items are therefore the addresses of the right-hand characters (both SM characters) in the items. These locations, provided in binary form for the addressing counters 10 and 11, are here called the primary addresses of the items. The addresses of the other characters in the item are termed the secondary character addresses and are here provided by changes (here, increases) in the count of the primary address. The extreme right and left-hand characters of an item may also be called the terminal characters.

The addresses or locations of items A and B are provided by the information handling system (not shown) as inputs to the reversible A address counter 10 and the reversible B address counter 11, respectively. Because the operation to be performed is assumed to be an addition the information handling system (not shown) also provides a "locate right character" signal to the add (A) inputs of the counters 10 and 11.

To begin an operation the information handling system (not shown) first provides a reset pulse, then the steady state read memory signal. The reset pulse sets the first flip-flop 70 through the second "or" circuit 62, and sets the second flip-flop 71 through the fourth "or" circuit 63. The resulting "1" output of the first flip-flop 70 activates one input each of the first "and" gate 12, the control "and" gates 26, and the third "and" gate 34. The third "and" gate 34 and the control "and" gates 26 may be said to be "primed" to provide outputs on the application of signals to their remaining inputs. Likewise, the "1" output of the second flip-flop 71 primes the control "and" gates 27 and the eighth "and" gate 35 and activates one input of the sixth "and" gate 13.

The read memory signal, applied following the reset pulse, sets the system in condition for operation. The read memory signal primes the second and seventh "and" gates 22 and 23, respectively, and activates one input each of the first "and" gate 12, sixth "and" gate 13, and output "and" gate 60. Following the read memory signal the system operates in timed sequence under control of the timing pulses $tp_1$ to $tp_8$.

At $tp_1$ the input "and" gates 16 and 17 are fully activated and place the binary addresses from the counters 10 and 11 in the high-speed memories 20 and 21, respectively. The A memory 20 is therefore addressed at location 191, the primary address of item A. The B memory 21 is addressed at location 302, the primary address of item B. The memories 20 and 21 hold the addresses provided until a read character signal is applied.

The second timing pulse, $tp_2$, is not employed. $Tp_3$, however, provides full activation of the first "and" gate 12 and the sixth "and" gate 13. A signal to be counted is thus directed to the reversible A address counter 10 from the first "and" gate 12, and to the reversible B address counter 11 from the sixth "and" gate 13. $Tp_3$ also fully activates the third "and" gate 34 and the eighth "and" gate 35, which provide reset signals to the A flip-flop register 30 and the B flip-flop register 31. The flip-flop registers 30 and 31 are therefore reset, preparatory to receiving new characters from the memories 20 and 21.

The $tp_5$ signal activates the second "and" gate 22 and the seventh "and" gate 23, providing read character signals to the memories 20 and 21, respectively. Thus, at $tp_5$, the A high-speed memory 20 reads out its addressed character, which is a special SM character. At $tp_5$, the B high-speed memory 21 also reads out a special SM character. The character from the A memory 20 is passed through the control "and" gates 26 and placed in the A flip-flop register 30. The character from the B memory 21 is passed through control "and" gates 27 and placed in the B flip-flop register 31. The registers 30 and 31 each staticize an SM character combination.

As stated above, the recognizers 38, 40, 39, and 41 provide high-level outputs except when given combinations are staticized by the registers 30 and 31. For simplicity, we assume here that only SM and Sp special characters are to be recognized. Thus the first and third "not special character" recognizers 38 and 39 may be responsive (provide low-level outputs) to SM characters, and the second and fourth "not special character" recognizers 40 and 41 may be responsive to Sp characters. More characters may be recognized by adding more recognizers in similar arrangements to each section (the A and B sides) of the system.

With the first characters provided, which are SM characters, the first and third "not special character" recognizers 38 and 39 provide low-level outputs, and the second and fourth "not special character" recognizers 40 and 41 provide high-level outputs. The fourth and ninth "and" gates 50 and 51 thus are not fully activated. The first inverter 44, however, provides a high-level output through the first "or" circuit 54. The first "or" circuit 54 output may be termed a "special character recognized" signal. Similarly, a special character recognized signal is provided from the third "or" circuit 55 in response to the high-level output of the third inverter 45. The special character recognized signals are steady state signals, because they are provided from the combinations staticized by the registers 30 and 31.

At $tp_7$ the first and second flip-flops 70 and 71, respectively, are reset. Because of the presence of the special character recognized signals, however, the subsequent $tp_8$ signal fully activates the fifth "and" gate 58 and the tenth "and" gate 59. The output of the fifth "and" gate 58 passes through the second "or" circuit 62, setting the first flip-flop 70. Similarly, the output of the tenth "and" gate 59 sets the second flip-flop 71 through the fourth "or" circuit 63. Thus, with the counters 10 and 11 advanced or stepped one count each to the next address locations, the system is prepared for a new timing pulse cycle.

Outputs are provided from the fourth and ninth "and" gates 50 and 51 only on the occurrence of information characters at the coupled registers 30 and 31, respectively. Thus the outputs of the fourth and ninth "and" gates 50 and 51 may be called "information character recognized" signals. Both information character recognized signals must be provided for the output "and" gate 60 to provide an items located signal.

A second cycle of steps occurs with secondary character addresses provided by the counters 10 and 11. The sequence carried out under control of the timing pulses is similar to that above described and need not be described again. In the second cycle special Sp characters are staticized in the registers 30 and 31. Therefore the second and fourth "not special character" recognizers 40 and 41 provide low-level outputs. Special character recognized signals are again provided from both the A and B sections, and the first and second flip-flops 70 and 71 are again set. The counters having been advanced to the next succeeding secondary address, a third cycle of time steps is begun.

In the third cycle the character staticized by the A flip-flop register 30 from item A is an "8" in the chosen example. At the same time the B flip-flop register 31 staticizes a special Sp character. The fourth "not special character" recognizer 41 again provides a low-level output, resulting in a special character recognized signal to once more set the second flip-flop 71. The first flip-flop 70 is reset at $tp_7$ but is not again set, however. Both the first and second "not special character" recognizers 38 and 40, respectively, provide high-level outputs. Thus the fourth "and" gate 50 is fully activated and provides an information character recognized signal. At $tp_8$ the fifth "and" gate 58 is not primed by a special character recognized signal and provides no output. Thus inputs of the first "and" gate 12, the control "and" gates 26 and the third "and" gate 34 are not activated. Signals to be counted are no longer applied to the reversible A address counter 10. The A flip-flop register 30 receives neither reset signals from the third "and" gate 34 or character combinations from the A memory 20 through control "and" gates 26. Therefore, the A address counter 10 continues holding the address of the "6" of item A (4268) and the A register 30 retains storage of the "8" of item A through subsequent timing cycles.

A fourth cycle of timed steps is carried out, but in this cycle only the item B side of the arrangement has an effective sequence. The "3" in item B is read from the B memory 21 and placed into the B flip-flop register 31. Both the third and fourth "not special character" recognizers 39 and 41 provide high-level outputs. Thus the ninth "and" gate 51 provides an information character reconized signal, activating an input of the output "and" gate 60. The second flip-flop 71 is reset at $tp_7$ but not again set. Thus the B address counter 11 does not receive signals to be counted, and the B flip-flop register 31 holds the character "3."

At $tp_8$ in the fourth timing pulse cycle, however, the output "and" gate 60 is fully activated and provides an "items located" signal to the information handling system. The items located signal indicates the completion of the desired operation. The least significant characters of both items have been matched together and the memories may be operated in synchronism. Characters for subsequent operations may be taken in pairs from the registers 30 and 31.

Note that locating the left end characters is done similarly, except that the locate left character signal is provided to place the counters 10 and 11 in the subtract phase. In addition, the primary addresses are those of the left-hand characters of the two items. The counters, therefore, in counting down, address locations successively closer to the right-hand side of the item. It will be understood that, if desired, the order of significance of characters in a memory may be the reverse of that described here.

Note also that various elements and combinations may be used in place of certain units given here by way of example. "Special character," instead of "not special character" recognizers may be employed. Further, the fourth, ninth, and output "and" gates 50, 51, and 60, may be combined into one "and" gate if desired. A single side of the arrangement may be used independently to find information characters in a single memory.

Thus there has been described a memory reading system for locating sequences of information. The system operates rapidly and flexibly in finding information characters in groupings of information of variable, nonstandard length. The system is not limited to operation with a standard or maximum number of special characters in either or both of two groupings of information.

What is claimed is:

1. A reading system for operation with a memory having groupings of characters, said groupings including a sequence of information characters and special characters, said system operating to locate the sequence of information characters and comprising means for addressing said memory at predetermined character locations, said means including a counter counting in steps to address successive character locations for read-out therefrom, means for staticizing characters thus read out from said memory, means responsive to said staticizing means for distinguishing between said information characters and said special characters, means responsive to said character distinguishing means selectively to couple said staticizing means to said memory, and means responsive to said character distinguishing means selectively to step said counter to cause said addressing means to address the next successive character location.

2. A reading system for operation with a memory storing groupings of characters each having a primary address, said groups including a continuous sequence of information characters and special characters stored in secondary addresses in said primary address in said memory, said system operating to locate a desired terminal one of said sequence of information characters and comprising counter means settable at a primary address for addressing said memory, register means for staticizing characters provided from said memory, code recognition means responsive to said staticized characters for providing a signal indicating the absence of said special characters, means responsive to said code recognition means for providing a signal indicating the presence of said special characters, bistable means responsive to said special character present indicating signal means for providing conditioning signals, means responsive to said conditioning signals selectively to provide a signal to be counted to said counter means, thereby to provide a different secondary address by said counter means, means responsive to said conditioning signals selectively to couple said register means to said memory means, and means responsive to said code recognition means special character absent signal for signalling the selection of a desired terminal character.

3. A system to locate in an item a desired terminal character of a sequence of information characters stored in a memory at a primary item address and secondary character addresses, the item at said primary item address also including special characters at secondary character addresses, said system providing a sequence of timing signals and comprising a reversible counter settable at a primary address for addressing said memory, a flip-flop register for staticizing characters, at least one "not special character" recognizer responsive to said flip-flop register for signalling the absence of predetermined special characters, means including inverter means responsive to the "not special character" recognizer for signalling the presence of the predetermined special characters, means including a bistable multivibrator responsive to said means for signalling the presence of the predetermined special characters for providing conditioning signals, a plurality of first "and" gates responsive to said conditioning signals and said timing signals selectively to couple said memory to said flip-flop register, a second "and" gate responsive to said conditioning signals and said timing signals selectively to provide a signal to be counted to said counter, and gating means responsive to said "not special character" recognizer and said timing signals for signalling the location of a desired terminal information character.

4. An arrangement for matching together characters from a pair of memories in a system which provides timing signals, said arrangement comprising first and second addressing counters individually coupled to a first and a second of said memories, respectively, first and second flip-flop registers for staticizing characters, first and second means for recognizing predetermined characters in said first and second flip-flop registers respectively, first gating means responsive to said first character recognizing means and said timing signals selectively to couple said first memory to said first flip-flop register, second gating means responsive to said second character recognizing means and said timing signals selectively to couple said second memory to said second flip-flop register, third gating means responsive to said first character recognizing means and said timing signals selectively to advance said first addressing counter, fourth gating means responsive to said second character recognizing means and said timing signals selectively to advance said second addressing counter, and fifth gating means responsive to said first and second character recognizing means for signalling the matching together of desired characters.

5. An arrangement for matching together information characters from two groupings of characters which may include special characters, each of said groupings being stored in a separate memory system including counter addressing means, said arrangement comprising first and second holding means for staticizing characters provided from said memory systems, first and second character distinguishing means responsive to said first and second holding means, respectively, for separately signalling the absence of special characters, first and second inverter means responsive to said first and second distinguishing means, respectively, first and second gating means responsive to said first and second inverter means, respectively, selectively to couple said first and second holding means, respectively, to said memory systems, third and fourth gating means responsive to said first and second distinguishing means, respectively, selectively to apply signals to be counted to said counter addressing means, and means responsive to said first and second distinguishing means for signalling the coincidence of information characters.

6. A reading system for operation with a memory having variable, non-standard, maximum length groupings of characters, said groupings including a sequence of information characters and special characters, said system operating to locate the particular sequence of information characters within said grouping and comprising means for addressing said memory at character locations and reading characters therefrom, said addressing means including a counter to address successive said character locations corresponding to successive counts in said counter, means for staticizing characters thus read out from said memory, special character recognition means coupled to said staticizing means for selectively coupling said staticizing means to said memory and for selectively advancing the count in said counter to cause read-out of the next successive character from said memory.

7. An arrangement for matching together information characters from two groupings of characters which may include special characters, each of said groupings being stored in a separate memory system including counter addressing means, said arrangement comprising first and second holding means for staticizing characters provided from said memory systems, first and second special character recognizing means coupled to said first and second holding means, respectively, first and second gating means responsive to said first and second special character recognizing means, respectively, selectively to couple said first and second holding means, respectively, to said memory systems, and third and fourth gating means responsive to said first and second special character recognizing means, respectively, selectively to apply signals to be counted to said counter addressing means.

8. A memory reading system comprising a memory, counter means for said memory, a read-out means responsive to said counter means for reading out of said memory characters at memory addresses corresponding to the count in said counter means, register means for staticizing the characters thus read out, means for recognizing a certain kind of said characters as different from others of said characters in said register means, gating means responsive to the recognition of a character of said certain kind by said character recognizing means selectively to couple the output of said memory to said register means, and gating means responsive to said recognition by said character recognizing means and operative at the same time as said output coupling means selectively to advance said addressing counter means to read out the character stored in said memory at the next successive address thereof.

References Cited in the file of this patent

UNITED STATES PATENTS

| | | |
|---|---|---|
| 2,679,638 | Bensky | May 25, 1954 |
| 2,680,240 | Greenfield | June 1, 1954 |
| 2,721,990 | McNaney | Oct. 25, 1955 |

OTHER REFERENCES

Publication I: Design Features of the ERA Computer by F. C. Mullaney, vol. 71 of Electrical Engineering, Issue No. 11, published November 1952, pages 1015–1018.

Publication II: An Electronic Computer by Beard and Pearcy, vol. 29 of Journal of Scientific Instruments, Issue No. 10, published October 1952, pages 305–311.